(12) United States Patent
Uehara et al.

(10) Patent No.: US 9,353,201 B2
(45) Date of Patent: May 31, 2016

(54) HYDROGENATED BLOCK COPOLYMER AND METHOD FOR PRODUCING SAME

(71) Applicants: KURARAY CO., LTD., Kurashiki-shi (JP); AMYRIS, INC., Emeryville, CA (US)

(72) Inventors: Yosuke Uehara, Kamisu (JP); Hiromitsu Sasaki, Kamisu (JP)

(73) Assignees: KURARAY CO., LTD., Kurashiki-shi (JP); AMYRIS, INC., Emeryville, CA (US)

( * ) Notice: Subject to any disclaimer, the term of this patent is extended or adjusted under 35 U.S.C. 154(b) by 0 days.

(21) Appl. No.: 14/405,213

(22) PCT Filed: May 31, 2013

(86) PCT No.: PCT/JP2013/065290
§ 371 (c)(1),
(2) Date: Dec. 3, 2014

(87) PCT Pub. No.: WO2013/183570
PCT Pub. Date: Dec. 12, 2013

(65) Prior Publication Data
US 2015/0197588 A1    Jul. 16, 2015

(30) Foreign Application Priority Data

Jun. 8, 2012 (JP) ................... 2012-131178

(51) Int. Cl.
| | | |
|---|---|---|
| C08F 293/00 | (2006.01) |
| C08F 4/00 | (2006.01) |
| C08F 4/56 | (2006.01) |
| C08F 136/00 | (2006.01) |
| C08F 12/02 | (2006.01) |
| C08F 36/22 | (2006.01) |
| C08F 8/04 | (2006.01) |
| C08C 19/02 | (2006.01) |
| C08F 297/04 | (2006.01) |

(52) U.S. Cl.
CPC ............. C08F 36/22 (2013.01); C08C 19/02 (2013.01); C08F 8/04 (2013.01); C08F 297/04 (2013.01)

(58) Field of Classification Search
CPC ........ C08F 297/02; C08F 297/04; C08F 8/04; C08F 36/22; C08C 19/02
USPC ............... 525/321; 526/346, 335, 90, 174
See application file for complete search history.

(56) References Cited

U.S. PATENT DOCUMENTS

| | | | |
|---|---|---|---|
| 7,279,532 B2 | 10/2007 | Sasagawa et al. | |
| 2010/0056714 A1 | 3/2010 | McPhee | |
| 2010/0331511 A1 | 12/2010 | McPhee | |
| 2010/0331800 A1* | 12/2010 | McPhee | ............. A61L 15/58 604/366 |

FOREIGN PATENT DOCUMENTS

| | | |
|---|---|---|
| CN | 102164974 A | 8/2011 |
| CN | 102203145 A | 9/2011 |
| JP | 2777239 | 7/1998 |
| JP | 2009-84458 | 4/2009 |
| JP | 2010-90267 | 4/2010 |
| JP | 2012-502135 | 1/2012 |
| JP | 2012-502136 | 1/2012 |
| WO | 2010/087440 A1 | 8/2010 |
| WO | 2012/111644 A1 | 8/2012 |
| WO | 2013/047347 A1 | 4/2013 |

OTHER PUBLICATIONS

International Search Report issued Jul. 16, 2013, in PCT/JP2013/065290, filed May 31, 2013.
Combined Chinese Office Action and Search Report issued Aug. 18, 2015 in Patent Application No. 201380029187.1 (with English translation of categories of cited documents).

* cited by examiner

*Primary Examiner* — William Cheung
(74) *Attorney, Agent, or Firm* — Oblon, McClelland, Maier & Neustadt, L.L.P.

(57) ABSTRACT

The present invention relates to a hydrogenated block copolymer including a polymer block (A) containing a constitutional unit derived from an aromatic vinyl compound and a polymer block (B) containing from 1 to 100% by mass of a constitutional unit (b1) derived from farnesene and from 99 to 0% by mass of a constitutional unit (b2) derived from a conjugated diene other than the farnesene, in which 50 mol % or more of carbon-carbon double bonds in the polymer block (B) are hydrogenated.

10 Claims, No Drawings

HYDROGENATED BLOCK COPOLYMER AND METHOD FOR PRODUCING SAME

This application is a U.S. National stage application of International Application No. PCT/JP2013/065290, filed May 31, 2013, which claims priority to Japan Patent Application No. 2012-131178 filed on Jun. 8, 2012, the contents of each of which are hereby incorporated herein by reference.

TECHNICAL FIELD

The present invention relates to a hydrogenated block copolymer containing a monomer unit derived from farnesene, and a process for producing the same.

BACKGROUND ART

Hydrogenated block copolymers constituted of a polymer block containing a constitutional unit derived from an aromatic vinyl compound and a polymer block containing a constitutional unit derived from a conjugated diene exhibit properties similar to those of vulcanized rubbers without subjecting the copolymers to vulcanization, i.e., are excellent in damping property, flexibility, rubber elasticity and weather resistance, and therefore have been extensively used in the applications such as sundries, parts for automobiles, various industrial parts, etc.

The hydrogenated block copolymers are produced, for example, by subjecting a block copolymer obtained by sequentially polymerizing an aromatic vinyl compound and a conjugated diene such as isoprene and butadiene to hydrogenation (for example, refer to PTL1 and PTL2).

Meanwhile, PTL3 and PTL4 describe a polymer of β-farnesene, but fail to make a sufficient study on practical properties thereof.

CITATION LIST

Patent Literature

PTL1: JP 2777239B
PTL2: JP 2010-090267A
PTL3: JP 2012-502135A
PTL4: JP 2012-502136A

SUMMARY OF INVENTION

Technical Problem

The hydrogenated block copolymers disclosed in PTL1 and PTL2 are excellent in damping property, flexibility, rubber elasticity and weather resistance, but must be still improved in properties thereof.

Thus, an object of the present invention is to provide a novel hydrogenated block copolymer that is still more excellent in various properties as described above, and a process for producing the same.

Solution to Problem

According to the present invention, the above object can be achieved by the following aspects of the present invention.
[1] A hydrogenated block copolymer including a polymer block (A) containing a constitutional unit derived from an aromatic vinyl compound and a polymer block (B) containing from 1 to 100% by mass of a constitutional unit (b1) derived from farnesene and from 99 to 0% by mass of a constitutional unit (b2) derived from a conjugated diene other than the farnesene, in which 50 mol % or more of carbon-carbon double bonds in the polymer block (B) are hydrogenated.
[2] A process for producing the hydrogenated block copolymer including the steps of:
a polymerization step of obtaining a block copolymer containing the polymer block (A) and the polymer block (B) by anionic polymerization; and
a hydrogenation step of hydrogenating 50 mol % or more of carbon-carbon double bonds in the polymer block (B) contained in the block copolymer.

Advantageous Effects of Invention

According to the present invention, it is possible to provide a hydrogenated block copolymer that is excellent in damping property, flexibility, rubber elasticity and weather resistance, and a process for producing the hydrogenated block copolymer.

DESCRIPTION OF EMBODIMENTS

Hydrogenated Block Copolymer

The hydrogenated block copolymer according to the present invention is in the form of a block copolymer including a polymer block (A) containing a constitutional unit derived from an aromatic vinyl compound and a polymer block (B) containing from 1 to 100% by mass of a constitutional unit (b1) derived from farnesene and from 99 to 0% by mass of a constitutional unit (b2) derived from a conjugated diene other than the farnesene (hereinafter referred to as a "block copolymer (P)"), in which 50 mol % or more of carbon-carbon double bonds in the polymer block (B) are hydrogenated (hereinafter referred to as a "hydrogenated block copolymer (HP)").

<Polymer Block (A)>

The polymer block (A) contains a constitutional unit derived from an aromatic vinyl compound. Examples of the aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. These aromatic vinyl compounds may be used alone or in combination of any two or more thereof. Of these aromatic vinyl compounds, preferred are styrene, α-methyl styrene and 4-methyl styrene, and more preferred is styrene.

<Polymer Block (B)>

The polymer block (B) contains from 1 to 100% by mass of a constitutional unit (b1) derived from farnesene and from 99 to 0% by mass of a constitutional unit (b2) derived from a conjugated diene other than the farnesene.

[Constitutional Unit (b1) Derived From Farnesene]

The constitutional unit (b1) may be a constitutional unit derived from either α-farnesene or β-farnesene represented by the following formula (I). However, from the viewpoint of facilitated production of the block copolymer (P), the preferred constitutional unit (b1) is a constitutional unit derived from β-farnesene. Meanwhile, the α-farnesene and β-farnesene may be used in combination with each other to form the constitutional unit (b1).

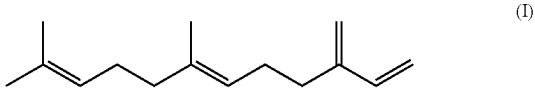 (I)

[Constitutional Unit (b2) Derived From Conjugated Diene Other Than Farnesene]

Examples of the conjugated diene constituting the constitutional unit (b2) derived from a conjugated diene other than the farnesene include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. These conjugated dienes may be used alone or in combination of any two or more thereof. Of these conjugated dienes, preferred are butadiene, isoprene and myrcene.

The polymer block (B) contains the constitutional unit (b1) derived from farnesene in an amount of from 1 to 100% by mass, and also contains the constitutional unit (b2) derived from a conjugated diene other than the farnesene in an amount of from 99 to 0% by mass. When the content of the constitutional unit (b1) derived from farnesene in the polymer block (B) is less than 1% by mass, the resulting hydrogenated block copolymer (HP) tends to be deteriorated in damping property.

From the viewpoint of a good damping property of the resulting hydrogenated block copolymer, the content of the constitutional unit (b1) in the polymer block (B) is preferably from 30 to 100% by mass, more preferably from 45 to 100% by mass, still more preferably from 65 to 100% by mass, and even still more preferably from 85 to 100% by mass.

The hydrogenated block copolymer (HP) is a hydrogenated product of the block copolymer (P) containing at least one polymer block (A) and at least one polymer block (B), and preferably a hydrogenated product of the block copolymer (P) containing two or more polymer blocks (A) and one or more polymer blocks (B).

The bonding configuration of the polymer block (A) and the polymer block (B) is not particularly limited, and may be either a linear configuration, a branched configuration, a radial configuration or a combination of these configurations. Of these configurations, preferred is the configuration in which the polymer block (A) and the polymer block (B) are linearly bonded to each other, and more preferably is the configuration represented by $(A-B)_l$, $A-(B-A)_m$ or $B-(A-B)_n$ wherein A and B are the polymer block (A) and the polymer block (B), respectively, and l, m and n are each independently an integer of 1 or more.

Of those copolymers having the above bonding configurations, from the viewpoints of a good rubber elasticity, good mechanical properties, a good handling property, etc., preferred is a tri-block copolymer having the configuration represented by A-B-A.

In addition, in the case where the block copolymer (P) contains two or more polymer blocks (A) or two or more polymer blocks (B), the two or more polymer blocks (A) or (B) may be respectively polymer blocks containing the same constitutional unit or polymer blocks containing different kinds of constitutional units from each other. For example, in the two polymer blocks (A) in the tri-block copolymer represented by [A-B-A], the respective aromatic vinyl compounds contained therein may be constituted of either the same kind of compound or different kinds of compounds.

<Properties of Block Copolymer (P)>

The mass ratio [(A)/(B)] of the polymer block (A) to the polymer block (B) in the block copolymer (P) is preferably from 5/95 to 80/20, more preferably from 7/93 to 70/30, and still more preferably from 9/91 to 65/35, from the viewpoints of a good mechanical strength and a good damping property of the resulting hydrogenated block copolymer (HP).

<Properties of Hydrogenated Block Copolymer (HP)>

The peak top molecular weight (Mp) of the hydrogenated block copolymer (HP) is preferably from 4,000 to 1,500,000, more preferably from 9,000 to 1,200,000, still more preferably from 50,000 to 1,100,000, even still more preferably from 90,000 to 1,100,000, further even still more preferably from 120,000 to 900,000, further even still more preferably from 150,000 to 600,000, and further even still more preferably from 180,000 to 300,000, from the viewpoint of a good moldability of the resulting hydrogenated block copolymer (HP).

Meanwhile, the peak top molecular weight (Mp) as used in the present specification means the value as measured by the method described below in Examples.

The molecular weight distribution (Mw/Mn) of the hydrogenated block copolymer (HP) is preferably from 1 to 4, more preferably from 1 to 3, and still more preferably from 1 to 2. When the molecular weight distribution (Mw/Mn) of the hydrogenated block copolymer (HP) falls within the above-specified range, the resulting hydrogenated block copolymer (HP) can exhibit a less variation in viscosity thereof.

The loss tangent (tan δ) of the hydrogenated block copolymer (HP) as determined by measuring a dynamic viscoelasticity of the hydrogenated block copolymer at a temperature of from −60 to 0° C. is preferably 0.1 or more, more preferably 0.15 or more, and still more preferably 0.2 or more. When the loss tangent (tan δ) of the hydrogenated block copolymer (HP) falls within the above-specified range, the resulting hydrogenated block copolymer (HP) is excellent in damping property.

[Polymer Block (C) Derived From Other Monomer]

The block copolymer (P) may also contain a polymer block (C) derived from the other monomer in addition to the polymer block (A) and the polymer block (B) unless the effects of the present invention are adversely affected.

Examples of the other monomer include unsaturated hydrocarbon compounds such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene; functional group-containing unsaturated compounds such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamide-2-methylpropanesulfonic acid, 2-methacrylamide-2-methylpropanesulfonic acid, vinylsulfonic acid, vinyl acetate and methyl vinyl ether; and the like. These other monomers may be used alone or in combination of any two or more thereof.

When the block copolymer (P) contains the polymer block (C), the content of the polymer block (C) in the block copolymer (P) is preferably not more than 50% by mass, more preferably not more than 40% by mass, and still more preferably not more than 30% by mass.

[Process for Producing Hydrogenated Block Copolymer (HP)]

The hydrogenated block copolymer (HP) may be suitably produced, for example, by a process including a polymerization step of obtaining the block copolymer (P) by anionic polymerization; and a hydrogenation step of hydrogenating 50 mol % or more of carbon-carbon double bonds in the polymer block (B) contained in the block copolymer (P).

<Polymerization Step>

The block copolymer (P) may be produced by any suitable polymerization method such as a solution polymerization method, in particular, is preferably produced by the solution polymerization method. For example, various conventionally known polymerization methods including an ionic polymerization method such as an anionic polymerization method and a cationic polymerization method, a radical polymerization method or the like may be applied thereto. Of these methods, the anionic polymerization method is preferably used. In the anionic polymerization method, the aromatic vinyl compound and the farnesene and/or the conjugated diene other than the farnesene are sequentially added in the presence of a solvent and an anionic polymerization initiator as well as, if required, a Lewis base as an optional component, thereby obtaining the block copolymer (P).

Examples of the anionic polymerization initiator include alkali metals such as lithium, sodium and potassium; alkali earth metals such as beryllium, magnesium, calcium, strontium and barium; lanthanoid-based rare earth metals such as lanthanum and neodymium; and compounds containing the above alkali metals, alkali earth metals or lanthanoid-based rare earth metals. Of these anionic polymerization initiators, preferred are the alkali metals and the compounds containing the alkali metals, and more preferred are organic alkali metal compounds.

Specific examples of the organic alkali metal compound include organic lithium compounds such as methyl lithium, ethyl lithium, n-butyl lithium, sec-butyl lithium, t-butyl lithium, hexyl lithium, phenyl lithium, stilbene lithium, dilithiomethane, dilithionaphthalene, 1,4-dilithiobutane, 1,4-dilithio-2-ethyl cyclohexane and 1,3,5-trilithiobenzene; and sodium naphthalene and potassium naphthalene, etc. Among these organic alkali metal compounds, preferred are organic lithium compounds; more preferred are n-butyl lithium and sec-butyl lithium; and especially preferred is sec-butyl lithium. Meanwhile, the organic alkali metal compound may be reacted with a secondary amine such as diisopropylamine, dibutylamine, dihexylamine and dibenzylamine to use the compound in the form of an organic alkali metal amide.

The amount of the organic alkali metal compound used for the polymerization may vary depending upon a molecular weight of the resulting block copolymer (P), and is usually in the range of from 0.01 to 3% by mass on the basis of a total amount of the aromatic vinyl compound and at least one compound selected from the group consisting of the farnesene and the conjugated diene other than the farnesene.

The solvent used in the polymerization step is not particularly limited unless it adversely affects the anionic polymerization reaction. Examples of the solvent used in the polymerization step include saturated aliphatic hydrocarbons such as n-pentane, isopentane, n-hexane, n-heptane and isooctane; saturated alicyclic hydrocarbons such as cyclopentane, cyclohexane and methyl cyclopentane; and aromatic hydrocarbons such as benzene, toluene and xylene. These solvents may be used alone or in combination of any two or more thereof. The amount of the solvent used in the polymerization step is not particularly limited.

The Lewis base acts for controlling a microstructure of each of the constitutional unit derived from the farnesene and the constitutional unit derived from the conjugated diene other than the farnesene. Examples of the Lewis base include ether compounds such as dibutyl ether, diethyl ether, tetrahydrofuran, dioxane and ethylene glycol diethyl ether; pyridine; tertiary amines such as N,N,N',N'-tetramethylethylenediamine and trimethylamine; and alkali metal alkoxides such as potassium-t-butoxide; and phosphine compounds. The amount of the Lewis base, if used, is usually preferably in the range of from 0.01 to 1,000 mol equivalent on the basis of 1 mol of the anionic polymerization initiator.

The temperature used in the above polymerization reaction is usually from −80 to 150° C., preferably from 0 to 100° C. and more preferably from 10 to 90° C. The polymerization reaction may be carried out by either a batch method or a continuous method. The aromatic vinyl compound, and the farnesene and/or the conjugated diene other than the farnesene are respectively supplied to the polymerization reaction solution in a continuous or intermittent manner such that the abundance ratio of the aromatic vinyl compound, and the farnesene and/or the conjugated diene other than the farnesene in the polymerization reaction system falls within a specific range, or the aromatic vinyl compound, and the farnesene and/or the conjugated diene other than the farnesene are sequentially polymerized such that the ratio of the respective monomers in the polymerization reaction solution is controlled to a specific range, whereby it is possible to produce the block copolymer (P).

The polymerization reaction may be stopped by adding an alcohol such as methanol and isopropanol as a terminating reagent to the reaction system. The resulting polymerization reaction solution may be poured into a poor solvent such as methanol to precipitate the block copolymer (P). Alternatively, there may be used the method in which the polymerization reaction solution is washed with water, and then an organic layer is separated therefrom and dried to isolate the block copolymer (P) therefrom.

{Modified Copolymer}

In the polymerization step, the block copolymer (P) can be obtained in the form of an unmodified block copolymer as described above. However, the block copolymer (P) may also be modified in the following manner.

The above block copolymer (P) may be modified prior to be subjected to the below-mentioned hydrogenation step. Examples of a functional group that may be introduced into the block copolymer (P) include an amino group, an alkoxysilyl group, a hydroxyl group, an epoxy group, a carboxyl group, a carbonyl group, a mercapto group, an isocyanate group and an acid anhydride group.

As the method of modifying the block copolymer, there may be used, for example, the method in which before adding the terminating reagent, a coupling reagent such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane and 2,4-tolylene diisocyanate which are capable of reacting with an active end of the polymer chain, a chain end-modifying reagent such as 4,4'-bis(diethylamino)benzophenone and N-vinylpyrrolidone, or the other modifying reagent as described in JP 2011-132298A is added to the polymerization reaction system. Furthermore, the isolated copolymer may be grafted with maleic anhydride or the like.

The site of the block polymer (P) into which the functional group is introduced may be either a chain end or a side chain of the polymer. In addition, these functional groups may be used alone or in combination of any two or more thereof. The modifying reagent is usually preferably used in an amount of from 0.01 to 10 mol equivalent on the basis of the anionic polymerization initiator used in the polymerization step.

(Hydrogenation Step)

When the block copolymer (P) obtained by the above method is subjected to hydrogenation step, it is possible to produce the hydrogenated block copolymer (HP). As the hydrogenation method, there may be used conventionally known methods. For example, a solution prepared by dissolving the block copolymer (P) in a solvent that has no adverse influence on the hydrogenation reaction is subjected to hydrogenation reaction in the presence of a hydrogenation catalyst. Examples of the hydrogenation catalyst include Ziegler-based catalysts; metal-supported catalysts obtained by supporting a metal such as nickel, platinum, palladium, ruthenium and rhodium on a carrier such as carbon, silica and diatomaceous earth; and organic metal complexes containing a metal such as cobalt, nickel, palladium, rhodium and ruthenium. In the hydrogenation step, the hydrogenation reaction may be carried out by adding the hydrogenation catalyst to the polymerization reaction solution containing the block copolymer (P) obtained by the above method for producing the block copolymer (P). In the present invention, there is preferably used palladium carbon formed by supporting palladium on carbon.

In the hydrogenation reaction, a hydrogen pressure used therein is preferably from 0.1 to 20 MPa, the reaction temperature is preferably from 100 to 200° C., and the reaction time is preferably from 1 to 20 h.

The hydrogenation rate of carbon-carbon double bonds in polymer block (B) contained in the block copolymer (P) is from 50 to 100 mol %, preferably from 70 to 100 mol %, and more preferably from 90 to 100 mol %, from the viewpoint of obtaining the hydrogenated block copolymer (HP) having excellent heat resistance and weather resistance. Meanwhile, the hydrogenation rate may be calculated by the method described below in Examples.

<Applications of Hydrogenated Block Copolymer (HP)>

The hydrogenated block copolymer (HP) may be suitably used as an adhesive or bonding reagent as well as a molded article such as a sheet, a film, a tube, a hose and a belt. More specifically, the hydrogenated block copolymer (HP) may be suitably used in the applications such as an adhesive or bonding reagent such as a hot melt adhesive, an adhesive tape and an adhesive layer for protective films; various vibration insulating materials or damping materials such as vibration-proof rubbers, mats, sheets, cushions, dampers, pads and mount rubbers; footgear such as sports shoes and fashion sandals; parts for domestic appliances such as televisions, stereo equipments, vacuum cleaners and refrigerators; building materials such as doors for buildings and packing for sealing of window frames; automobile interior and exterior parts such as bumper parts, body panels, weather strips, grommets, surface skins for installment panels and air bag covers; grips for scissors, screwdrivers, toothbrushes and skipoles; packaging materials for food such as food wrap films; medical equipments such as blood transfusion bags, syringes and catheters; plugs and cap liners for containers used for storage of food, beverages and drugs.

EXAMPLES

The present invention will be described in more detail below by referring to the following examples. It should be noted, however, that the following examples are only illustrative and not intended to limit the invention thereto. Meanwhile, β-farnesene (purity: 97.6% by weight; available from Amyris Biotechnologies Inc.) was purified using a 3 Å molecular sieve and distilled under a nitrogen atmosphere to remove hydrocarbon-based impurities such as zingiberene, bisabolene, farnesene epoxide, farnesol isomers, E,E-farnesol, squalene, ergosterol and several kinds of dimers of farnesene therefrom, and the thus purified β-farnesene was used in the following polymerization.

(1) Measurement of Molecular Weight Distribution Peak Top Molecular Weight (Mp)

The weight-average molecular weight (Mw) and the molecular weight distribution (Mw/Mn) of each of the hydrogenated block copolymers produced in the respective Examples and Comparative Examples were measured by GPC (gel permeation chromatography) in terms of a molecular weight of polystyrene as a reference standard substance to obtain a peak top molecular weight (Mp) thereof from a position of a peak top of the molecular weight distribution. The measuring devices and conditions are as follows.

Apparatus: GPC device "GPC8020" available from Tosoh Corp.
Separating column: "TSKgelG4000HXL" available from Tosoh Corp.
Detector: "RI-8020" available from Tosoh Corp.
Eluent: Tetrahydrofuran
Eluent flow rate: 1.0 mL/min
Sample concentration: 5 mg/10 mL
Column temperature: 40° C.

(2) Method for Measuring Hydrogenation Rate

In the respective Examples and Comparative Examples, the block copolymer (P) and the hydrogenated block copolymer (HP) obtained after hydrogenating the block copolymer were respectively dissolved in a deuterated chloroform solvent, and each of the resulting solutions was subjected to $^1$H-NMR measurement at 50° C. using "Lambda-500" available from JOEL Ltd. The hydrogenation rate of the polymer block (B) in the hydrogenated block copolymer (HP) was calculated from the peak of protons contained in carbon-carbon double bonds observed in the range of from 4.5 to 6.0 ppm in the resulting spectrum, according to the following formula.

Hydrogenation Rate={1−(number of moles of carbon-carbon double bonds contained per 1 mole of hydrogenated block copolymer (*HP*)/number of moles of carbon-carbon double bonds contained per 1 mole of block copolymer (*P*)}×100 (mol %)

(3) Weather Resistance

The hydrogenated block copolymer produced in the respective Examples and Comparative Examples was subjected to compression molding at 200° C. for 3 min, thereby obtaining a sheet having a thickness of 2 mm. The resulting sheet was allowed to stand in an atmosphere of a temperature of 200° C. for 60 min, and then measured for a b value thereof according to JIS Z8722 using "ND-300A" available from Nippon Denshoku Industries Co., Ltd., and the thus measured b value was used as an index of a weather resistance of the hydrogenated block copolymer. The lower the b value becomes, the more excellent the weather resistance of the hydrogenated block copolymer is. The b value is preferably 15.0 or less.

(4) Method for Measuring Tan δ

The hydrogenated block copolymer produced in the respective Examples and Comparative Examples was subjected to compression molding at 200° C. for 3 min, thereby obtaining a sheet having a thickness of 2 mm. The thus obtained sheet was punched into a cylindrical test piece having a diameter of 8 mm and a height of 2 mm, and the resulting test piece was measured for a tan δ thereof under the conditions of a temperature of from −100 to 50° C., a frequency of 1 Hz and a strain of 1% using a viscoelasticity measuring apparatus "RDA3" available from Rheometric Scientific Inc.

(5) Method for Measuring Hardness

The hardness was measured using an indenter of a type A durometer according to JIS K6253.

Meanwhile, the hydrogenated block copolymer (HP) having a hardness of 75 or less is excellent in flexibility.

(6) Tensile Permanent Elongation

The hydrogenated block copolymer produced in the respective Examples and Comparative Examples was subjected to compression molding at 200° C. for 3 min, thereby obtaining a sheet having a thickness of 1 mm. The thus obtained sheet was punched into a No. 3 type dumbbell-shaped test piece according to JIS K6251. Gauge marks were provided on parallel portions of the test piece at the intervals of 2 cm. The thus marked test piece was elongated such that the distance between the gauge marks was increased up to 4 cm (100% elongation). The thus elongated test piece was allowed to stand in an atmosphere of a temperature of 24° C. and a relative humidity of 50% for 10 min, and then the elongation force applied to the test piece was released. Thereafter, the distance (1': cm) between the gauge marks was measured when allowing the test piece to stand in an atmosphere of at a temperature of 24° C. and a relative humidity of 50% for 10 min, and the tensile permanent elongation of the test piece was calculated from the following formula.

Tensile Permanent Elongation (%)=100×(1'−2)/2

The lower the value of the tensile permanent elongation becomes, the more excellent the rubber elasticity of the hydrogenated block copolymer is.

(7) Compression Permanent Set (24° C.; 22 h)

The hydrogenated block copolymer produced in the respective Examples and Comparative Examples was subjected to compression molding at 200° C. for 3 min, thereby obtaining a cylindrical test piece having a diameter of 13.0±0.5 mm and a thickness ($d_0$) of 6.3±0.3 mm. The thus obtained cylindrical test piece was subjected to 25% compressive deformation using a spacer having a thickness ($d_1$) of 4.8 mm according to JIS K6262, and held under the compressive deformation in an atmosphere of a temperature of 24° C. for 22 h, and then the compressive deformation force applied to the test piece was released. Thereafter, the thickness ($d_2$: mm) of the cylindrical test piece was measured when allowing the test piece to stand in an atmosphere of a temperature of 24° C. and a relative humidity of 50% for 30 min, and the compression permanent set of the test piece was calculated from the following formula.

Compression Permanent Set (%)=100×($d_1$−$d_2$)/($d_0$−$d_1$)

The lower the value of the compression permanent set becomes, the more excellent the rubber elasticity of the hydrogenated block copolymer as measured at room temperature is. The compression permanent set is preferably less than 40%.

(8) Compression Permanent Set (70° C.; 22 h)

The same procedure as in the above (7) was repeated except that the temperature upon compression was changed to 70° C., thereby measuring a compression permanent set of the test piece.

The lower the value of the compression permanent set becomes, the more excellent the rubber elasticity of the hydrogenated block copolymer as measured at a high temperature is. The compression permanent set is preferably less than 80%.

(9) Rebound Resilience (Modulus of Repulsion Elasticity)

The hydrogenated block copolymer produced in the respective Examples and Comparative Examples was subjected to compression molding at 200° C. for 3 min, thereby obtaining a cylindrical test piece having a diameter of 29.0±0.5 mm and a thickness of 12.5±0.5 mm. The thus obtained cylindrical test piece was allowed to stand at a temperature of −50° C. for 1 h, and then subjected to Lubke rebound resilience test by the method according to JIS K6255 to measure a rebound resilience thereof at the time at which the temperature reached −20° C. The rebound resilience of the hydrogenated block copolymer is an index indicating a damping property thereof, and preferably less than 50%.

Example 1

A pressure reaction vessel previously purged with nitrogen and then dried was charged with 62.4 kg of cyclohexane as a solvent and 54.6 g of sec-butyl lithium (in the form of a 10.5% by mass cyclohexane solution) as an anionic polymerization initiator. The contents of the reaction vessel were heated to 50° C., and then 2.34 kg of styrene (1) was added thereto, followed by polymerizing the contents of the reaction vessel for 1 h. Successively, 10.92 kg of β-farnesene was added to the reaction vessel, followed by polymerizing the contents of the reaction vessel for 2 h. Furthermore, 2.34 kg of styrene (2) was added to the reaction vessel, followed by polymerizing the contents of the reaction vessel for 1 h, thereby obtaining a reaction solution containing a polystyrene-poly(β-farnesene)-polystyrene triblock copolymer (hereinafter referred to as a "block copolymer (P1)"). Added into the reaction solution was palladium carbon (amount of palladium supported: 5% by mass) as a hydrogenation catalyst which was used in an amount of 5% by mass on the basis of the block copolymer (P1), and the block copolymer was subjected to hydrogenation reaction under a hydrogen pressure of 2 MPa at a temperature of 150° C. for 10 h. The obtained reaction mixture was allowed to stand for cooling and pressure releasing, and then subjected to filtration to remove the palladium carbon therefrom. The resulting filtrate was concentrated and further vacuum-dried, thereby obtaining a hydrogenated product of the polystyrene-poly(β-farnesene)-polystyrene triblock copolymer (hereinafter referred to as a "hydrogenated block copolymer (HP1)"). The thus obtained hydrogenated block copolymer (HP1) was subjected to the above evaluation. The results are shown in Tables 1 and 4.

Examples 2 to 9

The same procedure as in Example 1 was repeated except for using the formulations as shown in Table 1, thereby obtaining hydrogenated block copolymers (HP2) to (HP9). The thus obtained hydrogenated block copolymers (HP2) to (HP9) were subjected to the above evaluation. The results are shown in Tables 1 and 4.

Example 10

A pressure reaction vessel previously purged with nitrogen and then dried was charged with 62.4 kg of cyclohexane as a solvent and 109.2 g of sec-butyl lithium (in the form of a 10.5% by mass cyclohexane solution) as an anionic polymerization initiator. The contents of the reaction vessel were heated to 50° C., and then 2.34 kg of styrene (1) was added thereto, followed by polymerizing the contents of the reaction vessel for 1 h. Successively, a mixture of 5.46 kg of β-farnesene and 5.46 kg of isoprene was added to the reaction vessel, followed by polymerizing the contents of the reaction vessel for 2 h. Furthermore, 2.34 kg of styrene (2) was added to the reaction vessel, followed by polymerizing the contents of the reaction vessel for 1 h, thereby obtaining a reaction solution containing a polystyrene-poly(β-farnesene/isoprene)-polystyrene triblock copolymer (hereinafter referred to as a "block copolymer (P10)"). Added into the reaction solution was palladium carbon (amount of palladium supported: 5% by mass) as a hydrogenation catalyst which was used in an amount of 5% by mass on the basis of the block copolymer (P10), and the block copolymer was subjected to hydrogenation reaction under a hydrogen pressure of 2 MPa at a temperature of 150° C. for 10 h. The obtained reaction mixture was allowed to stand for cooling and pressure releasing, and then subjected to filtration to remove the palladium carbon therefrom. The resulting filtrate was concentrated and further vacuum-dried, thereby obtaining a hydrogenated product of the polystyrene-poly(β-farnesene/isoprene) triblock copolymer (hereinafter referred to as a "hydrogenated block copolymer (HP10)"). The thus obtained hydrogenated block copolymer (HP10) was subjected to the above evaluation. The results are shown in Tables 2 and 4.

Examples 11 to 14

The same procedure as in Example 10 was repeated except for using the formulations as shown in Table 2, thereby obtaining hydrogenated block copolymers (HP11) to (HP14). The thus obtained hydrogenated block copolymers (HP11) to (HP14) were subjected to the above evaluation. The results are shown in Tables 2 and 4.

Comparative Example 1

The same procedure as in Example 4 of PTL4 was repeated to thereby obtain a styrene-(β-farnesene) block copolymer. The thus obtained styrene-(β-farnesene) block copolymer was subjected to the above evaluation. The results are shown in Tables 3 and 5.

Comparative Example 2

In the same manner as in Example 1, the polymerization was carried out, and the reaction solution containing the block copolymer (P1) was concentrated and further vacuum-dried, thereby obtaining the block copolymer (P1). The thus obtained block copolymer (P1) was subjected to the above evaluation. The results are shown in Tables 3 and 5.

Comparative Example 3

A pressure reaction vessel previously purged with nitrogen and then dried was charged with 62.4 kg of cyclohexane as a solvent and 210.6 g of sec-butyl lithium (in the form of a 10.5% by mass cyclohexane solution) as an anionic polymerization initiator. The contents of the reaction vessel were heated to 50° C., and then 1.88 kg of styrene (1) was added thereto, followed by polymerizing the contents of the reaction vessel for 1 h. Successively, 17.05 kg of isoprene was added to the reaction vessel, followed by polymerizing the contents of the reaction vessel for 2 h. Furthermore, 1.88 kg of styrene (2) was added to the reaction vessel, followed by polymerizing the contents of the reaction vessel for 1 h, thereby obtaining a reaction solution containing a polystyrene-polyisoprene-polystyrene triblock copolymer (hereinafter referred to as a "block copolymer (R-P3)"). Added into the reaction solution was palladium carbon (amount of palladium supported: 5% by mass) as a hydrogenation catalyst which was used in an amount of 5% by mass on the basis of the block copolymer (R-P3), and the block copolymer was subjected to hydrogenation reaction under a hydrogen pressure of 2 MPa at a temperature of 150° C. for 10 h. The obtained reaction mixture was allowed to stand for cooling and pressure releasing, and then subjected to filtration to remove the palladium carbon therefrom. The resulting filtrate was concentrated and further vacuum-dried, thereby obtaining a hydrogenated product of the polystyrene-polyisoprene-polystyrene triblock copolymer (hereinafter referred to as a "hydrogenated block copolymer (R-HP3)"). The thus obtained hydrogenated block copolymer (R-HP3) was subjected to the above evaluation. The results are shown in Tables 3 and 5.

Comparative Example 4

The same procedure as in Comparative Example 3 was repeated except for using the formulation as shown in Table 3, thereby obtaining a hydrogenated block copolymer (R-HP4). The thus obtained hydrogenated block copolymer (R-HP4) was subjected to the above evaluation. The results are shown in Tables 3 and 5.

Comparative Example 5

A pressure reaction vessel previously purged with nitrogen and then dried was charged with 62.4 kg of cyclohexane as a solvent, 163.1 g of sec-butyl lithium (in the form of a 10.5% by mass cyclohexane solution) as an anionic polymerization initiator and 360.3 g of tetrahydrofuran as a Lewis base. The contents of the reaction vessel were heated to 50° C., and then 2.08 kg of styrene (1) was added thereto, followed by polymerizing the contents of the reaction vessel for 1 h. Successively, 16.64 kg of isoprene was added to the reaction vessel, followed by polymerizing the contents of the reaction vessel for 2 h. Furthermore, 2.08 kg of styrene (2) was added to the reaction vessel, followed by polymerizing the contents of the reaction vessel for 1 h, thereby obtaining a reaction solution containing a polystyrene-polyisoprene-polystyrene triblock copolymer (hereinafter referred to as a "block copolymer (R-P5)"). Added into the reaction solution was palladium carbon (amount of palladium supported: 5% by mass) as a hydrogenation catalyst which was used in an amount of 5% by mass on the basis of the block copolymer (R-P5), and the block copolymer was subjected to hydrogenation reaction under a hydrogen pressure of 2 MPa at a temperature of 150° C. for 10 h. The obtained reaction mixture was allowed to stand for cooling and pressure releasing, and then subjected to filtration to remove the palladium carbon therefrom. The resulting filtrate was concentrated and further vacuum-dried, thereby obtaining a hydrogenated product of the polystyrene-polyisoprene-polystyrene triblock copolymer (hereinafter referred to as a "hydrogenated block copolymer (R-HP5)"). The thus obtained hydrogenated block copolymer (R-HP5) was subjected to the above evaluation. The results are shown in Tables 3 and 5.

Comparative Examples 6 and 7

The same procedure as in Comparative Example 5 was repeated except for using the formulations as shown in Table 3, thereby obtaining hydrogenated block copolymers (R-HP6) and (R-HP7). The thus obtained hydrogenated block copolymers (R-HP6) and (R-HP7) were subjected to the above evaluation. The results are shown in Tables 3 and 5.

Comparative Example 8

A pressure reaction vessel previously purged with nitrogen and then dried was charged with 62.4 kg of cyclohexane as a solvent and 179.4 g of sec-butyl lithium (in the form of a 10.5% by mass cyclohexane solution) as an anionic polymerization initiator. The contents of the reaction vessel were heated to 50° C., and then 2.34 kg of styrene (1) was added thereto, followed by polymerizing the contents of the reaction vessel for 1 h. Successively, a mixture of 5.46 kg of isoprene and 5.46 g of butadiene was added to the reaction vessel, followed by polymerizing the contents of the reaction vessel for 2 h. Furthermore, 2.34 kg of styrene (2) was added to the reaction vessel, followed by polymerizing the contents of the reaction vessel for 1 h, thereby obtaining a reaction solution containing a polystyrene-poly(isoprene/butadiene)-polystyrene triblock copolymer (hereinafter referred to as a "block copolymer (R-P8)"). Added into the reaction solution was palladium carbon (amount of palladium supported: 5% by mass) as a hydrogenation catalyst which was used in an amount of 5% by mass on the basis of the block copolymer (R-P8), and the block copolymer was subjected to hydrogenation reaction under a hydrogen pressure of 2 MPa at a temperature of 150° C. for 10 h. The obtained reaction mixture was allowed to stand for cooling and pressure releasing, and then subjected to filtration to remove the palladium carbon therefrom. The resulting filtrate was concentrated and further vacuum-dried, thereby obtaining a hydrogenated product of the polystyrene-poly(isoprene/butadiene)-polystyrene triblock copolymer (hereinafter referred to as a "hydrogenated block copolymer (R-HP8)"). The thus obtained hydrogenated block copolymer (R-HP8) was subjected to the above evaluation. The results are shown in Tables 3 and 5.

Comparative Example 9

The same procedure as in Comparative Example 8 was repeated except for using the formulation as shown in Table 3, thereby obtaining a hydrogenated block copolymer (R-HP9). The thus obtained hydrogenated block copolymer (R-HP9) was subjected to the above evaluation. The results are shown in Tables 3 and 5.

Comparative Example 10

A pressure reaction vessel previously purged with nitrogen and then dried was charged with 62.4 kg of cyclohexane as a solvent, 78.0 g of sec-butyl lithium (in the form of a 10.5% by mass cyclohexane solution) as an anionic polymerization initiator and 373.0 g of tetrahydrofuran as a Lewis base. The contents of the reaction vessel were heated to 50° C., and then 0.47 kg of styrene (1) was added thereto, followed by polymerizing the contents of the reaction vessel for 1 h. Successively, a mixture of 6.86 kg of isoprene and 6.86 kg of butadiene was added to the reaction vessel, followed by polymerizing the contents of the reaction vessel for 2 h. Furthermore, 1.41 kg of styrene (2) was added to the reaction vessel, followed by polymerizing the contents of the reaction vessel for 1 h, thereby obtaining a reaction solution containing a polystyrene-poly(isoprene/butadiene)-polystyrene triblock copolymer (hereinafter referred to as a "block copolymer (R-P10)"). Added into the reaction solution was palladium carbon (amount of palladium supported: 5% by mass) as a hydrogenation catalyst which was used in an amount of 5% by mass on the basis of the block copolymer (R-P10), and the block copolymer was subjected to hydrogenation reaction under a hydrogen pressure of 2 MPa at a temperature of 150° C. for 10 h. The obtained reaction mixture was allowed to stand for cooling and pressure releasing, and then subjected to filtration to remove the palladium carbon therefrom. The resulting filtrate was concentrated and further vacuum-dried, thereby obtaining a hydrogenated product of the polystyrene-poly(isoprene/butadiene)-polystyrene triblock copolymer (hereinafter referred to as a "hydrogenated block copolymer (R-HP10)"). The thus obtained hydrogenated block copolymer (R-HP10) was subjected to the above evaluation. The results are shown in Tables 3 and 5.

TABLE 1

| | Examples | | | | |
|---|---|---|---|---|---|
| | 1 | 2 | 3 | 4 | 5 |
| Amounts used [kg] | | | | | |
| Cyclohexane | 62.4 | 62.4 | 62.4 | 62.4 | 62.4 |
| sec-Butyl lithium (in the form of a 10.5% by mass cyclohexane solution) | 0.0546 | 0.0624 | 0.0624 | 0.1049 | 0.0546 |
| Styrene (1) | 2.34 | 1.40 | 0.78 | 2.34 | 2.34 |
| Styrene (2) | 2.34 | 1.40 | 0.78 | 2.34 | 2.34 |
| β-Farnesene | 10.92 | 12.79 | 14.04 | 10.92 | 10.92 |
| Butadiene | — | — | — | — | — |
| Isoprene | — | — | — | — | — |
| (b1)/(B) [% by mass] | 100 | 100 | 100 | 100 | 100 |
| (A)/(B) [mass ratio] | 30/70 | 18/82 | 10/90 | 30/70 | 30/70 |
| Triblock copolymer content [% by mass] | 100 | 100 | 100 | 100 | 100 |
| Properties | | | | | |
| Peak top molecular weight (Mp) | 209,000 | 203,900 | 210,000 | 99,500 | 209,000 |
| Molecular weight distribution (Mw/Mn) | 1.14 | 1.23 | 1.22 | 1.09 | 1.14 |
| Hydrogenation rate [%] | 90.6 | 92.8 | 93.0 | 91.5 | 55.2 |

| | Examples | | | |
|---|---|---|---|---|
| | 6 | 7 | 8 | 9 |
| Amounts used [kg] | | | | |
| Cyclohexane | 62.4 | 62.4 | 62.4 | 62.4 |
| sec-Butyl lithium (in the form of a 10.5% by mass cyclohexane solution) | 0.0546 | 0.0546 | 0.0156 | 0.0077 |

TABLE 1-continued

|  |  |  |  |  |
|---|---|---|---|---|
| Styrene (1) | 2.34 | 2.34 | 1.65 | 1.04 |
| Styrene (2) | 2.34 | 2.34 | 1.65 | 1.04 |
| β-Farnesene | 10.92 | 10.92 | 7.71 | 4.85 |
| Butadiene | — | — | — | — |
| Isoprene | — | — | — | — |
| (b1)/(B) [% by mass] | 100 | 100 | 100 | 100 |
| (A)/(B) [mass ratio] | 30/70 | 30/70 | 30/70 | 30/70 |
| Triblock copolymer content [% by mass] | 100 | 100 | 100 | 100 |
| Properties |  |  |  |  |
| Peak top molecular weight (Mp) | 209,000 | 209,000 | 602,000 | 978,000 |
| Molecular weight distribution (Mw/Mn) | 1.14 | 1.14 | 1.51 | 1.60 |
| Hydrogenation rate [%] | 75.0 | 98.0 | 90.6 | 90.6 |

TABLE 2

|  | Examples |  |  |  |  |
|---|---|---|---|---|---|
|  | 10 | 11 | 12 | 13 | 14 |
| Amounts used [kg] |  |  |  |  |  |
| Cyclohexane | 62.4 | 62.4 | 62.4 | 62.4 | 62.4 |
| sec-Butyl lithium (in the form of a 10.5% by mass cyclohexane solution) | 0.1092 | 0.117 | 0.0234 | 0.0312 | 0.0081 |
| Styrene (1) | 2.34 | 2.34 | 1.65 | 1.65 | 1.40 |
| Styrene (2) | 2.34 | 2.34 | 1.65 | 1.65 | 1.40 |
| β-Farnesene | 5.46 | 6.08 | 3.86 | 4.30 | 4.43 |
| Butadiene | — | 4.84 | — | 3.41 | — |
| Isoprene | 5.46 | — | 3.86 | — | 8.36 |
| (b1)/(B) [% by mass] | 50 | 56 | 50 | 56 | 35 |
| (A)/(B) [mass ratio] | 30/70 | 30/70 | 30/70 | 30/70 | 18/82 |
| Triblock copolymer content [% by mass] | 100 | 100 | 100 | 100 | 100 |
| Properties |  |  |  |  |  |
| Peak top molecular weight (Mp) | 123,600 | 118,200 | 415,000 | 408,000 | 152,000 |
| Molecular weight distribution (Mw/Mn) | 1.06 | 1.04 | 1.12 | 1.13 | 1.08 |
| Hydrogenation rate [%] | 98.4 | 99.4 | 98.0 | 99.0 | 99.4 |

TABLE 3

|  | Comparative Examples |  |  |  |  |  |
|---|---|---|---|---|---|---|
|  | 1 | 2 | 3 | 4 | 5 | 6 |
| Amounts used [kg] |  |  |  |  |  |  |
| Cyclohexane | 62.4 | 62.4 | 62.4 | 62.4 | 62.4 | 62.4 |
| sec-Butyl lithium (in the form of a 10.5% by mass cyclohexane solution) | 0.2175 | 0.0546 | 0.2106 | 0.1872 | 0.1631 | 0.0234 |
| Tetrahydrofuran | — | — | — | — | 0.3603 | 0.3286 |
| Styrene (1) | 10.40 | 2.34 | 1.88 | 2.34 | 2.08 | 1.82 |
| Styrene (2) | — | 2.34 | 1.88 | 2.34 | 2.08 | 1.82 |
| β-Farnesene | 10.40 | 10.92 | — | — | — | — |
| Butadiene | — | — | — | — | — | — |
| Isoprene | — | — | 17.05 | 10.92 | 16.64 | 7.38 |
| Dichlorosilane | 0.01802 | — | — | — | — | — |
| (b1)/(B) [% by mass] | 100 | 100 | 0 | 0 | 0 | 0 |
| (A)/(B) [mass ratio] | 50/50 | 30/70 | 18/82 | 30/70 | 20/80 | 33/67 |
| Triblock copolymer content [% by mass] | 5 | 100 | 100 | 100 | 100 | 100 |
| Properties |  |  |  |  |  |  |
| Peak top molecular weight (diblock) (Mp) | 66,400 | — | — | — | — | — |
| Peak top molecular weight (triblock) (Mp) | 143,000 | 209,000 | 97,000 | 85,000 | 107,000 | 315,000 |

TABLE 3-continued

|  |  |  |  |  |  |  |
|---|---|---|---|---|---|---|
| Molecular weight distribution (Mw/Mn) | 1.11 | 1.14 | 1.03 | 1.03 | 1.07 | 1.09 |
| Hydrogenation rate [%] | 0.0 | 0.0 | 99.0 | 99.1 | 85.1 | 97.2 |

|  | Comparative Examples | | | |
|---|---|---|---|---|
|  | 7 | 8 | 9 | 10 |
| Amounts used [kg] | | | | |
| Cyclohexane | 62.4 | 62.4 | 62.4 | 62.4 |
| sec-Butyl lithium (in the form of a 10.5% by mass cyclohexane solution) | 0.2106 | 0.1794 | 0.0390 | 0.0780 |
| Tetrahydrofuran | 0.0977 | — | — | 0.3730 |
| Styrene (1) | 2.34 | 2.34 | 1.65 | 0.47 |
| Styrene (2) | 2.34 | 2.34 | 1.65 | 1.41 |
| β-Farnesene | — | — | — | — |
| Butadiene | 10.92 | 5.46 | 3.86 | 6.86 |
| Isoprene | — | 5.46 | 3.85 | 6.86 |
| Dichlorosilane | — | — | — | — |
| (b1)/(B) [% by mass] | 0 | 0 | 0 | 0 |
| (A)/(B) [mass ratio] | 30/70 | 30/70 | 30/70 | 12/88 |
| Triblock copolymer content [% by mass] | 100 | 100 | 100 | 100 |
| Properties | | | | |
| Peak top molecular weight (diblock) (Mp) | — | — | — | — |
| Peak top molecular weight (triblock) (Mp) | 78,000 | 92,000 | 271,000 | 175,000 |
| Molecular weight distribution (Mw/Mn) | 1.13 | 1.07 | 1.06 | 1.02 |
| Hydrogenation rate [%] | 99.0 | 99.2 | 99.4 | 87.0 |

TABLE 4

|  | Examples | | | | | | | | | | | | |
|---|---|---|---|---|---|---|---|---|---|---|---|---|---|
|  | 1 | 2 | 3 | 4 | 5 | 6 | 7 | 8 | 10 | 11 | 12 | 13 | 14 |
| tan δ (−60° C.) | 0.37 | 0.56 | 0.58 | 0.31 | 1.67 | 1.30 | 0.30 | 0.40 | 0.21 | 0.26 | 0.20 | 0.23 | 0.20 |
| tan δ (0° C.) | 0.21 | 0.23 | 0.26 | 0.15 | 0.19 | 0.21 | 0.13 | 0.23 | 0.12 | 0.12 | 0.13 | 0.13 | 0.11 |
| tan δ (peak top) | 2.38 | 2.71 | 2.91 | 2.01 | 2.38 | 2.38 | 2.35 | 2.45 | 1.35 | 0.56 | 1.41 | 0.60 | 1.32 |
| tan δ (peak top temperature) (° C.) | −50.2 | −49.3 | −49.0 | −50.0 | −56.3 | −52.7 | −49.0 | −49.9 | −49.2 | −48.6 | −49.2 | −48.8 | −50.5 |
| Hardness | 17 | 5 | 1 | 50 | 11 | 12 | 16 | 10 | 69 | 75 | 66 | 70 | 58 |
| b value | 9.0 | 9.2 | 8.2 | 8.8 | 14.5 | 9.8 | 4.5 | 8.9 | 4.6 | 4.1 | 4.6 | 4.0 | 4.1 |
| Tensile permanent elongation (%) | 0.8 | 0.9 | 1.0 | 1.0 | 1.0 | 1.0 | 0.8 | 1.1 | 7.7 | 6.7 | 7.5 | 7.0 | 3.3 |
| Compression permanent set (24° C.; 22 h) (%) | 5 | 6 | 7 | 7 | 5 | 5 | 5 | 9 | 27 | 27 | 20 | 36 | 33 |
| Compression permanent set (70° C.; 22 h) (%) | 22 | 26 | 30 | 34 | 25 | 16 | 20 | 16 | 73 | 63 | 44 | 42 | 58 |
| Rebound resilience (%) | 35 | 22 | 20 | 37 | 12 | 15 | 36 | 25 | 41 | 48 | 40 | 42 | 40 |

TABLE 5

|  | Comparative Examples | | | | | | | | | |
|---|---|---|---|---|---|---|---|---|---|---|
|  | 1 | 2 | 3 | 4 | 5 | 6 | 7 | 8 | 9 | 10 |
| tan δ (−60° C.) | 0.37 | 1.76 | 0.19 | 0.19 | <0.01 | 0.01 | 0.26 | 0.22 | * | 0.02 |
| tan δ (0° C.) | 0.08 | 0.21 | 0.06 | 0.07 | 1.44 | 0.92 | 0.07 | 0.07 | * | 0.29 |
| tan δ (peak top) | 0.69 | 2.72 | 1.14 | 1.14 | 2.31 | 1.35 | 0.47 | 0.52 | * | 2.36 |
| tan δ (peak top temperature) (° C.) | −65.8 | −64.8 | −52.8 | −52.8 | −5.8 | −6.8 | −48.8 | −52.2 | * | −21.8 |
| Hardness | 87 | 7 | 67 | 80 | 64 | 68 | 77 | 76 | * | 41 |
| b value | 22.7 | 24.6 | 3.1 | 2.7 | 8.9 | * | 3.4 | 1.8 | * | 8.7 |
| Tensile permanent elongation (%) | ** | 1.0 | 3.9 | 7.4 | 5.0 | * | 8.6 | 8.2 | * | 5.0 |

TABLE 5-continued

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Compression permanent set (24° C.; 22 h) (%) | 84 | 6 | 28 | 22 | 15 | * | 38 | 36 | * | 35 |
| Compression permanent set (70° C.; 22 h) (%) | 100 | 29 | 100 | 91 | 85 | * | 90 | 87 | * | 98 |
| Rebound resilience (%) | ** | 25 | 35 | 29 | 65 | * | 52 | 53 | * | 63 |

Note
* Unmeasurable.
** Sample was broken.

From the results shown in Tables 1, 2 and 4, it was confirmed that the hydrogenated block copolymers (HP-1) to (HP14) obtained in Examples 1 to 14, respectively, were excellent in flexibility, weather resistance and rubber elasticity, and exhibited a tan δ of 0.1 or more as measured at a temperature of from −60 to 0° C. and therefore had a low rebound resilience and an excellent damping property. Furthermore, the hydrogenated block copolymers (HP-1) to (HP8) obtained in Examples 1 to 8, respectively, exhibited, in particular, a low hardness, a low tensile permanent elongation, a low compression permanent set and a low rebound resilience, and therefore had an excellent flexibility, a high rubber elasticity and a high damping property.

On the other hand, from the results shown in Tables 3 and 5, it was confirmed that the block copolymer obtained in Comparative Example 1 which was not hydrogenated exhibited a poor weather resistance, and had a tan δ of less than 0.1 as measured at a temperature of 0° C. and therefore was deteriorated in damping property. In addition, the block copolymer of Comparative Example 1 had a triblock copolymer content of less than 20% by mass, and exhibited a high compression permanent set and therefore was deteriorated in rubber elasticity. Meanwhile, it was not possible to evaluate a tensile permanent elongation and a rebound resilience of the block copolymer of Comparative Example 1 because the sample was broken during the measurement.

The block copolymer (P1) of Comparative Example 2 was deteriorated in weather resistance because it was not hydrogenated.

The hydrogenated block copolymers [(R-HP3) to (R-HP8) and (R-HP10)] obtained in Comparative Examples 3 to 8 and 10 whose polymer block (B) contained no constitutional unit derived from β-farnesene had a tan δ of less than 0.1 as measured at a temperature of −60° C. or 0° C. and therefore were deteriorated damping property. Furthermore, the hydrogenated block copolymers [(R-HP3) to (R-HP8) and (R-HP10)] exhibited a high compression permanent set as measured at 70° C. and therefore were deteriorated in rubber elasticity at a high temperature.

Meanwhile, the hydrogenated block copolymer (R-HP9) obtained in Comparative Example 9 had a poor flowability and therefore failed to form a compression-molded sheet for evaluation of various properties thereof.

The invention claimed is:

1. A hydrogenated block copolymer comprising a polymer block (A) and a polymer block (B), wherein the polymer block (A) comprises a constitutional unit derived from an aromatic vinyl compound and the polymer block (B) comprises from 1 to 100% by mass of a constitutional unit (b1) derived from farnesene and from 99 to 0% by mass of a constitutional unit (b2) derived from a conjugated diene other than the farnesene, and wherein 50 mol % or more of carbon-carbon double bonds in the polymer block (B) are hydrogenated,
   wherein the polymer block (B) comprises a hydrogenation rate of carbon-carbon double bonds of 70 to 100 mol %.

2. The hydrogenated block copolymer according to claim 1, wherein the farnesene is β-farnesene.

3. The hydrogenated block copolymer according to claim 1, wherein the polymer block (B) comprises a hydrogenation rate of carbon-carbon double bonds of 90 to 100 mol %.

4. The hydrogenated block copolymer according to claim 1, wherein the hydrogenated block copolymer comprises a mass ratio [(A)/(B)] of the polymer block (A) to the polymer block (B) of 5/95 to 80/20.

5. The hydrogenated block copolymer according to claim 1, wherein the hydrogenated block copolymer comprises a peak top molecular weight (Mp) of 4,000 to 1,500,000.

6. The hydrogenated block copolymer according to claim 1, wherein the hydrogenated block copolymer comprises a molecular weight distribution (Mw/Mn) of 1 to 4.

7. The hydrogenated block copolymer according to claim 1, wherein the aromatic vinyl compound is styrene.

8. The hydrogenated block copolymer according to claim 1, wherein the conjugated diene other than the farnesene is at least one compound selected from the group consisting of isoprene, butadiene and myrcene.

9. The hydrogenated block copolymer according to claim 1, wherein the hydrogenated block copolymer has a loss tangent (tan δ) of 0.1 or more as determined by measuring a dynamic viscoelasticity thereof at a temperature of from −60 to 0° C.

10. A process for producing the hydrogenated block copolymer according to claim 1, comprising:
   obtaining a block copolymer comprising the polymer block (A) and the polymer block (B) by anionic polymerization; and
   hydrogenating 50 mol % or more of carbon-carbon double bonds in the polymer block (B) present in the block copolymer.

* * * * *